United States Patent
Sheynman et al.

(10) Patent No.: US 6,914,913 B2
(45) Date of Patent: Jul. 5, 2005

(54) MULTI-MODE INTEROPERABLE MOBILE STATION COMMUNICATIONS ARCHITECTURES AND METHODS

(75) Inventors: Arnold Sheynman, Glenview, IL (US); Carl Grube, Barrington, IL (US); Rajendra K. Kosgi, Mundelein (IN); Rohini Polisetty, Grayslake, IL (US); Mahesh Perepa, Hyderabad (IN); Maloor Ramachandra Sreekrishna, Bangalore (IN); Krishnamurthy Srinath Vijayaprasad, Karnataka (IN); Sharada Raghuram, Buffalo Grove, IL (US); Donald Arthur Dorsey, Vernon Hills, IL (US); Kevin Michael Spriggs, Chicago, IL (US); Ramesh Sudini, Palatine, IL (US)

(73) Assignee: Motorola, Inc., Schaumburg, IL (US)

(*) Notice: Subject to any disclaimer, the term of this patent is extended or adjusted under 35 U.S.C. 154(b) by 64 days.

(21) Appl. No.: 10/228,484

(22) Filed: Aug. 27, 2002

(65) Prior Publication Data

US 2004/0042437 A1 Mar. 4, 2004

(51) Int. Cl.[7] .................................. H04J 3/16
(52) U.S. Cl. ....................................... 370/469
(58) Field of Search ............................ 370/469, 465, 370/466, 467, 470, 471, 474, 475, 476, 477, 479, 441, 442, 341, 342, 343, 344, 345, 350, 503, 335, 337, 320, 324, 468; 455/422.1, 428, 455, 465, 552.1, 553.1, 554.2, 556.2, 560, 426.1, 426.2

(56) References Cited

U.S. PATENT DOCUMENTS 5,946,634 A * 8/1999 Korpela ................... 455/552.1
6,542,490 B1 * 4/2003 Ahmadvand et al. ....... 370/338

FOREIGN PATENT DOCUMENTS

EP          0994604        * 4/2000

* cited by examiner

*Primary Examiner*—Dang T Ton
(74) *Attorney, Agent, or Firm*—Roland K. Bowler, II

(57) ABSTRACT

A multi-mode mobile wireless communications device architecture (200) including an application layer (210), a services layer (220) interfacing the applications layer, a multi-mode layer (230) interfacing the service layer, and a hardware layer (240) interfacing the multi-mode layer. The multi-mode layer includes first and second interoperable radio access technologies, for example W-CDMA UMTS and GSM/GPRS technologies.

14 Claims, 5 Drawing Sheets

MULTI-MODE INTEROPERABLE MOBILE STATION COMMUNICATIONS ARCHITECTURES AND METHODS

FIELD OF THE INVENTIONS

The present inventions relate generally to wireless mobile station communications, and more particularly to wireless mobile station communication architectures with multi-mode interoperability, for example communications supporting time division multiple access (TDMA) based and spread spectrum based modes of operation, wireless devices having multi-mode architectures and methods therefor.

BACKGROUND OF THE INVENTIONS

Wireless cellular communication mobile stations with multi-service interoperability will enable communications in areas served by different communications protocols, otherwise referred to herein as a heterogeneous communications environments.

The initial deployment of new communications technologies is characterized typically by limited areas of new technology service in contiguous regions served by legacy technologies. In many countries, for example, the W-CDMA implementation of Universal Mobile Telecommunications Services (UMTS) will be deployed initially on isolated islands of service in a sea served by existing Groupe Special Mobile services (GSM)/Generalized Packet Radio Services (GPRS) network infrastructure.

UMTS services will not be offered over substantial contiguous areas until new technology infrastructure is installed or until existing infrastructure is upgraded, but this will require substantial capital outlays by telecommunications services providers and may not be complete for some time, resulting in a heterogeneous communications environment in many geographic regions for the foreseeable future.

Multi-mode cellular handsets capable of operating in areas served by emerging and legacy communications infrastructures will provide users earlier access to the emerging communications technology and hasten its deployment. Multi-mode wireless communications devices are also desirable for communications in other heterogeneous environments.

Mobile wireless communications devices will require architectures with multi-mode interoperability for seamless operation in heterogeneous communications environments.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

Figure 1:
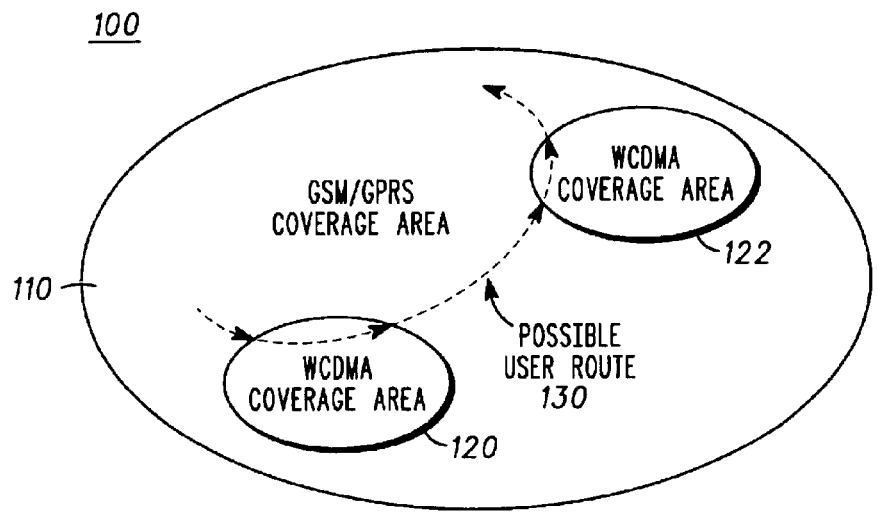
FIG. 1 is an exemplary communications coverage area served by two different communications protocols.

FIG. 1 is an exemplary heterogeneous communications environment 100 comprising a relatively contiguous GSM/GPRS coverage area 110 and several isolated W-CDMA coverage areas 120 and 122. The heterogeneous environment of FIG. 1 is typical of the early stages of deployment of advanced communications network infrastructure, e.g., a W-CDMA network, in area where an existing infrastructure, e.g., GSM/GPRS, is already well established. The exemplary environment 100 is not limited to one served by the exemplary radio access networks, but may be served more generally by a heterogeneous network comprising any radio access technologies, for example, one comprising $3^{rd}$ and $4^{th}$ generation communications service and beyond.

For multi-mode wireless communications devices operating in heterogeneous networks, for example a mobile terminal following user route 130 in FIG. 1, it is desirable for the communications devices to simultaneously monitor cells of the different radio access networks in idle and active modes to perform cell selection and handover procedures, including the bi-directional handoff of radio access bearer services, for example in networks comprising GSM Base Station Subsystems (BSS) and Universal Terrestrial Radio Access Network (UTRAN) access networks.

Figure 2:
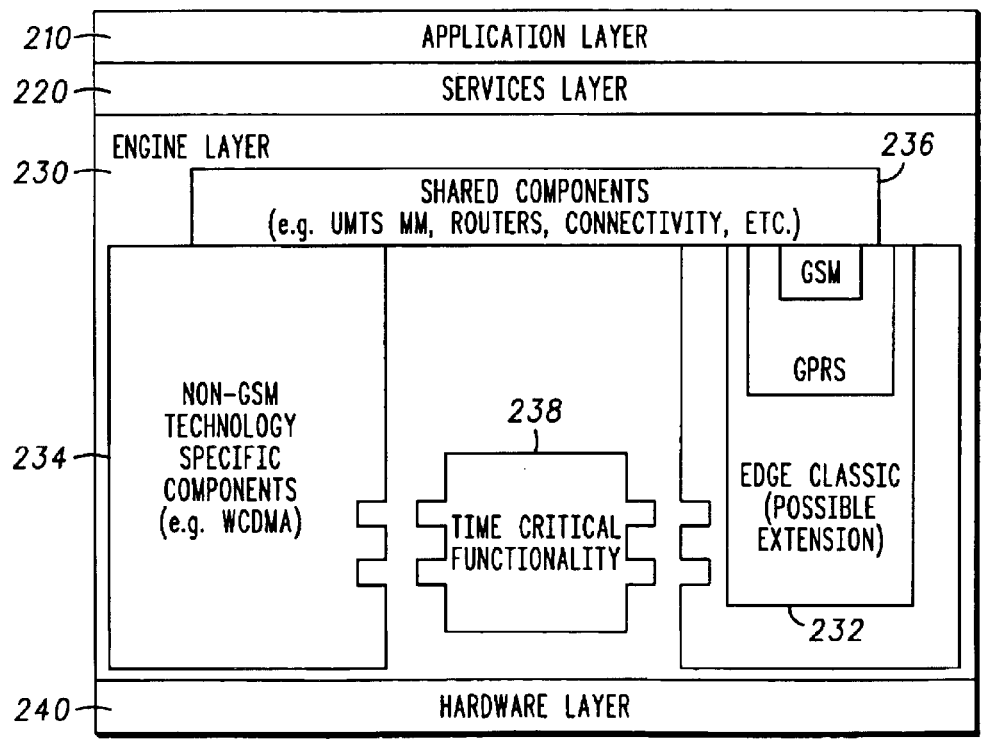
FIG. 2 is an exemplary multi-mode mobile station communications architecture.

FIG. 2 is an exemplary multi-mode mobile wireless communications device architecture 200 comprising generally an application layer 210 interfaced with a services layer 220 interfaced with a multi-mode layer 230, comprising at least two interoperable radio access technologies, interfaced with a hardware layer 240.

In FIG. 2, the application layer 200, at the top of the model, comprises generally one or more application subsystems. In the exemplary architecture 300 of FIG. 3, the application layer 310 includes a single application subsystem comprising an AT command parser 312, an application manager 314, and, for example, Synergy applications. The application layer may also include generally other application subsystems, for example a Java Virtual Machine and its corresponding applications, among other application subsystems.

Figure 3:
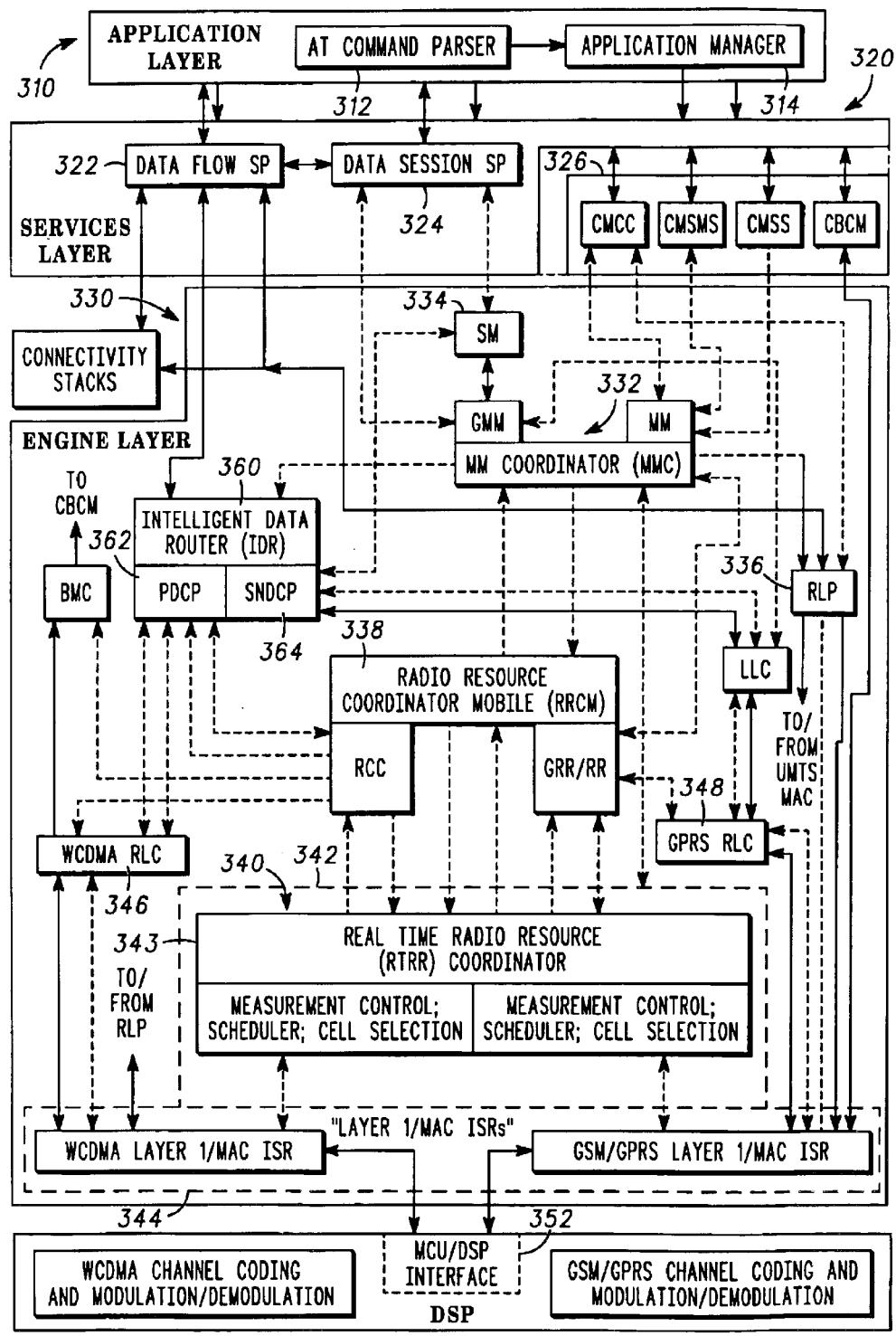
FIG. 3 is a more detailed schematic of an exemplary multi-mode mobile station architecture for GSM and W-CDMA communications.

In FIG. 3, the exemplary services layer 320 comprises a Data Flow Service Provider (DFSP) 322, a Data Session Service Provider (DSSP) 324, and Connection Management (CM) components 326. The application layer interfaces with the services layers and communications therebetween are performed by function calls, for example Application Utility Functions (AUF). Communications also occur within the application and services layers, for example, between the DFSP 324 and the DSSP 324.

The multi-mode layer comprises generally an interoperability entity that interconnects the radio access technologies. In FIG. 2, the first radio access technology 232 is a GSM/GPRS radio access technology, which may include an extension, for example EDGE or EDGE Classic. The second radio access technology 234 is a non-GSM technology, for example Wideband Code Division Multiple Access (W-CDMA) Universal Mobile Telecommunications Services (UMTS) radio access technology.

In FIG. 2, the multi-mode layer, or engine layer, comprises generally a common subsystem 236 comprising components shared among the different radio access technologies, for example mobility management layer, data router, connectivity components, etc. The engine layer also includes a time critical functionality control component 238, which is shared among the radio access technologies, for example for measurement control, scheduling, cell selection, etc. as discussed more fully below.

In the exemplary architecture of FIG. 3, the components shared by the first and second radio access technologies include the application layer 310 and the services layer 320. In one embodiment, several components of the multi-mode layer 330 are also shared by the radio access technologies, including the mobility management component 332, the Session Management (SM) component 334, the Radio Link Protocol (RLP) component 336, and other components discussed further below. In FIG. 3, a Digital Signal Processing (DSP) component 350 includes generally modulation and demodulation functionality for the corresponding radio access technologies, WCDMA and GSM/GPRS in the exemplary embodiment.

In the exemplary embodiment of FIG. 3, the architecture includes a radio resource layer 338 for transitioning between the first and second radio access technologies. In this exemplary embodiment, the radio resource layer is shared by the radio access technologies.

Figure 4:
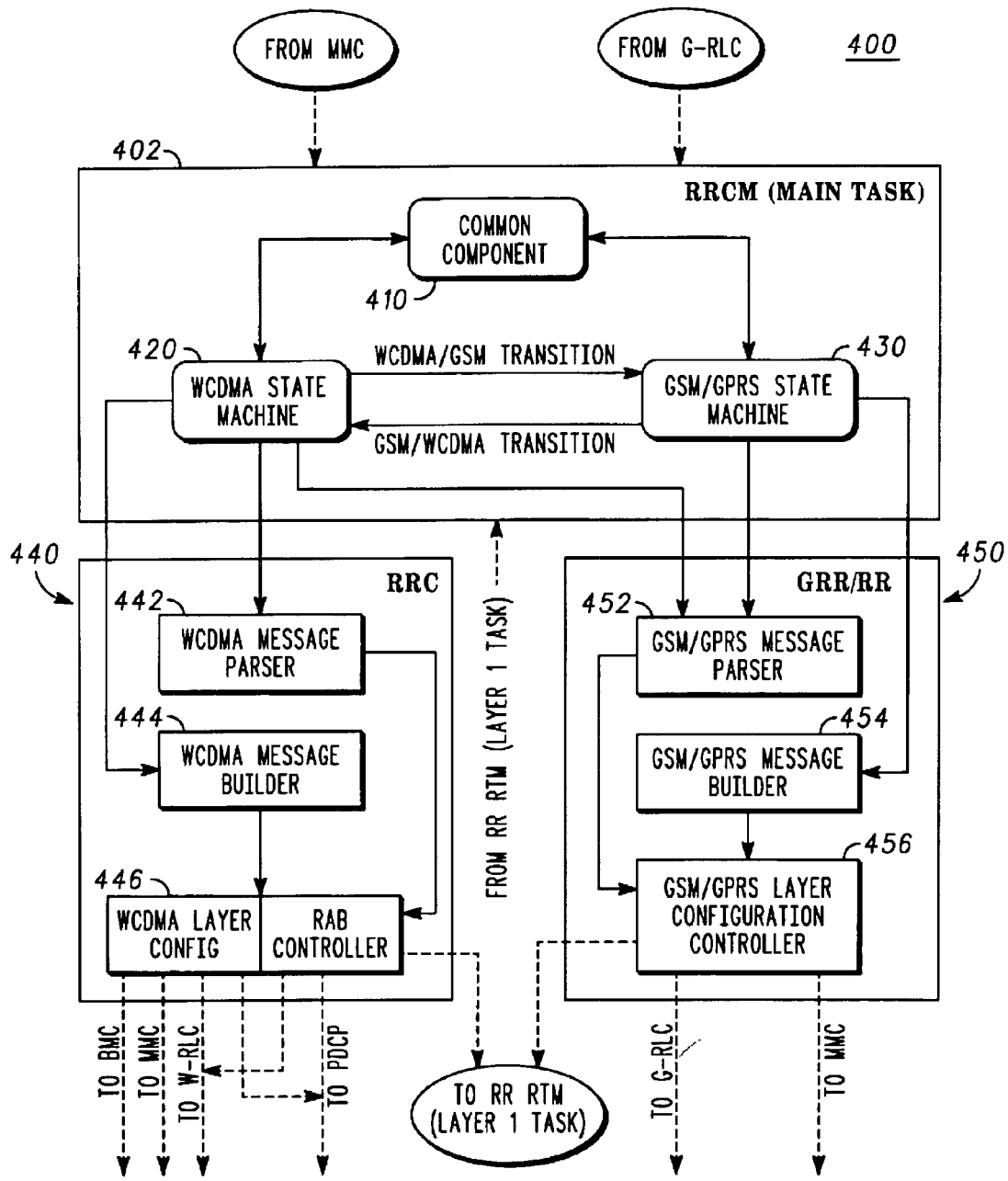
FIG. 4 is an exemplary radio resource coordinator module for multi-mode communication architectures.

FIG. 4 is a more detailed illustration of the radio resource layer 400 comprising a radio resource component 402 including a state transition component 410 and first and second state machines 420 and 430 for the corresponding radio access technologies. Other state machines may be included for embodiments that include additional radio access technologies. The state transition component 410 generally allocates resources among the first and second radio access technologies. The state transition component also maintains current state information while transitioning from one state machine to the other to enable returning to the current state if the transition is unsuccessful.

In the exemplary embodiment of FIG. 4, the first state machine 420 is coupled generally to a W-CDMA radio resource entity (RRC) 440, which includes a W-CDMA message parser 442, a message builder 444, and a layer configuration controller 446, among other known functionality elements. The second state machine 430 is coupled to the GPRS radio resource (GRR)/GSM radio resource (RR) entity 450, which includes a GSM/GPRS message parser 452, a message builder 454, and a configuration controller 456, among other known elements. The radio resource entities 440 and 450 and corresponding elements are specific to the radio access technologies in the device.

In FIG. 3, the radio resource layer 338 communicates radio resource status and other control information, for example registration area and NAS system information, PLMN availability, etc., to a mobility management layer, and in the exemplary embodiment to a mobility management component 332 thereof, the functionality of which is discussed more fully below.

In FIG. 3, a timing component 340 is coupled to the radio resource layer 338. The exemplary timing component 340 is divided into a real-time task processing portion 342, and an interrupt-processing portion 344. The real-time task portion is coupled to corresponding portions of the radio access technologies for performing real-time processing, and the interrupt-processing portion is coupled to the radio access technologies for performing interrupt processing.

Time critical radio access technology functionality, for example, Public Land Mobile Network (PLMN) selection, cell selection and reselection, signal measurement, handover, etc., is coordinated by a real-time coordinator 343 in the real-time portion of the timing component. The real-time coordinator reports status and other information to the radio resource layer 338, and the real-time coordinator controls switching between radio access technologies under control from the radio resource component 337.

For example, during initial cell selection the radio resource component 337 controls cell selection on the appropriate radio access technology, for example GSM or W-CDMA in the exemplary embodiment, commands power measurement and channel synchronization, commands to read system information scheduled by Radio Resource (RR) component, and follows cell selection procedure to camp on the most suitable cell. After finding a cell to camp on, the radio resource component sends an indication to RR/RRC. If no cells are found suitable on the desired radio access technology, cell selection procedure on the other radio access technology is selected. If no suitable cells are found, an available PLMN list is sent to radio resource component.

The timing component also controls interrupt processing, for example medium access control (MAC) functionality of the first and second radio access technologies. The W-CDMA Layer 1/MAC interruption service routine (ISR) functionality includes, for example, DSP timing, transport to logical and vice verse channel mapping, etc. The timing component also controls interrupt processing for the GSM/GPRS Layer 1 MAC ISR, for example Adaptive Gain Control (AGC), Adaptive Frequency Control (AFC), waveform generation, MAC procedures, etc.

Interrupt processing information is communicated from each Layer 1 MAC ISR to the corresponding radio logic control (RLC) components 346 and 348 of the first and second radio access technologies and to a DSP 350 via an Micro Controller Unit (MCU)/DSP interface 352 common to both radio access technologies.

Figure 5:
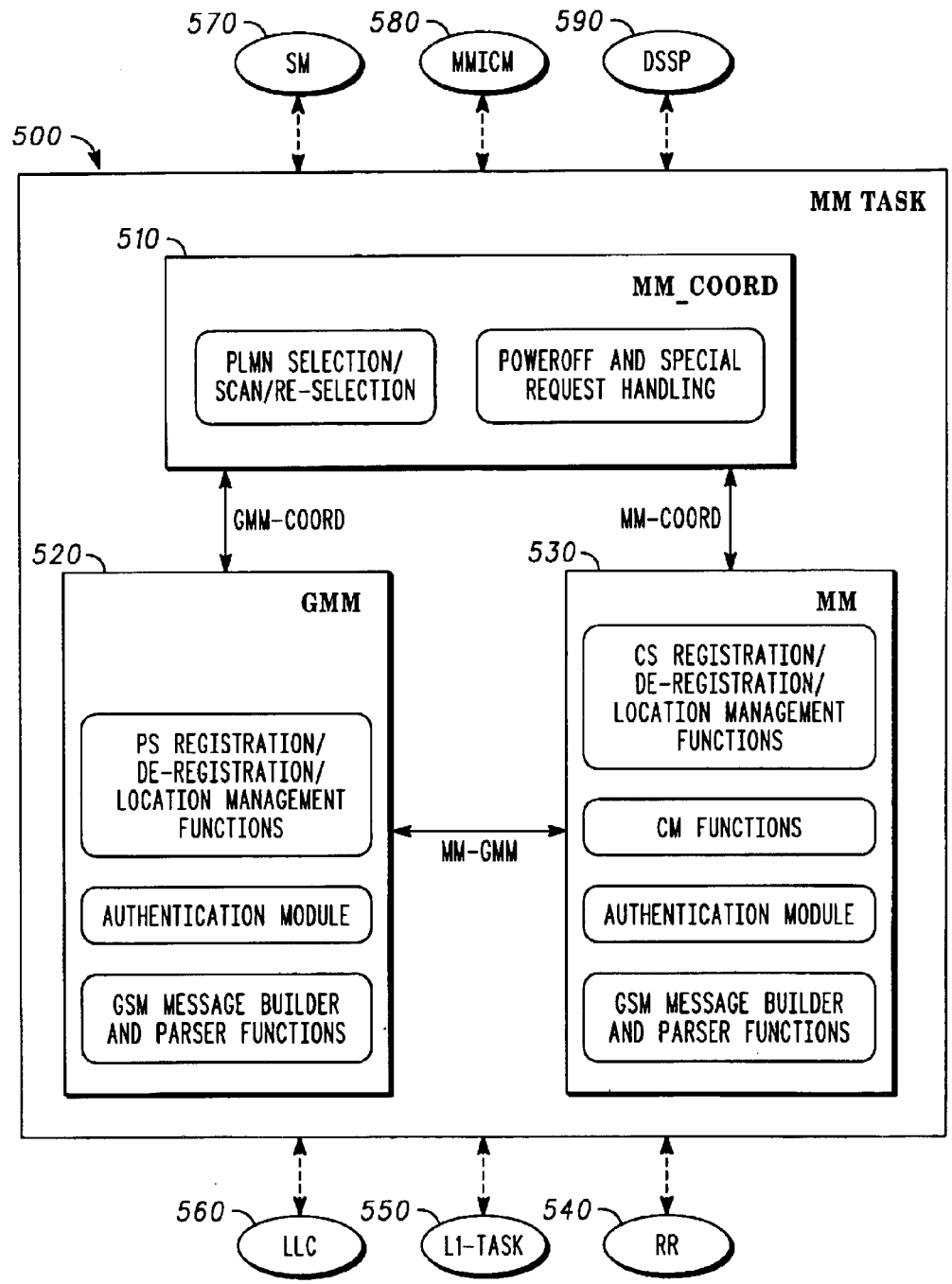
FIG. 5 is an exemplary mobility management component for multi-mode communication architectures.

FIG. 5 is an exemplary mobility management task layer 500 comprising a mobility management component 510 coupled a GPRS Mobility Management (GMM), element 520 and to a Mobility Management (MM) element 530. The GMM and MM components include functionality blocks specific to the integrated radio access technology, for example registration, de-registration and location management, authentication, message building and parsing, etc.

The mobility management layer interfaces with the radio resource layer 540, the radio access technology L1-task layer 550, the GSM Logical Link Control (LLC) entity 560, the Session Management (SM) entity 570, the MMICM 580, and the DSSP 590. These interfaces are also illustrated generally in FIG. 3. The mobility management layer also interfaces with and provide radio access technology status information to the data router as discussed below.

In the exemplary embodiment of FIG. 3, a data router 360 is coupled to the services layer 320, and particularly to the data flow service provider (DFSP) 322 thereof by a bi-direction data bus. The data router 360 is also coupled to the first and second radio access technologies, and in the exemplary embodiment to a W-CDMA Packet Data Communications Protocol (PDCP) 362 and to a GSM Sub Network Dependent Communications Protocol (SNDCP) 364.

Figures 6, 7, 8:
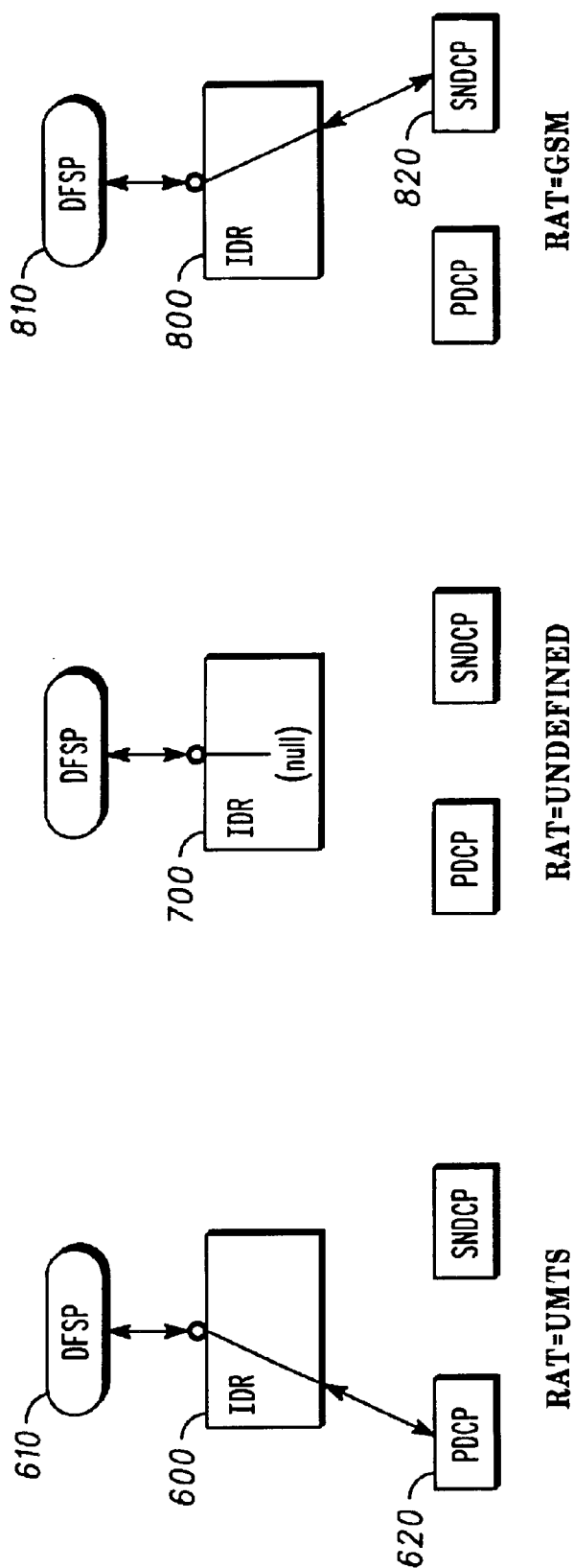
FIG. 6 is an exemplary data router configuration.
FIG. 7 is another exemplary data router configuration.
FIG. 8 is another exemplary data router configuration.

The data router 360 generally routes data between the services layer 320 and one of the radio access technologies. In FIG. 3, the radio resource component 338 is coupled to the data router 360 by the mobility management module 332, which provides control information to the data router for selecting one of the radio access technologies. In FIG. 6, the data router 600 is configured for routing data from the DFSP 610 to the PDCP 620 for W-CDMA radio access technology (RAT). In FIG. 7, the data router 700 is configured for null mode, as occurs when the radio access technology is undefined, and FIG. 8 illustrates the data router 800 configured for routing data from the DFSP 810 to the SNDCP 820 for GSM radio access technology.

While the present inventions and what are considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A multi-mode mobile wireless communications device architecture, comprising:
    an application layer;
    a services layer interfacing the applications layer;
    a multi-mode layer interfacing the services layer,
    the multi-mode layer comprising an interoperability entity interconnecting first and second radio access technologies, the first radio access technology different than the second radio access technology;
    a hardware layer interfacing the multi-mode layer;
    a radio resource layer having a first state machine of the first radio access technology, a second state machine of the second radio access technology, a state transition component coupled to the first and second state machines, the first and second state machines coupled to each other.

2. The multi-mode mobile wireless communications device architecture of claim 1, the first radio access technology is a Wideband Code Division Multiple Access (W-CDMA) Universal Mobile Telecommunications Services (UMTS) radio access technology, the second radio access technology is a Generalized Packet Radio Services (GPRS) radio resource/Groupe Special Mobile (GSM) radio access technology.

3. The multi-mode mobile wireless communications device architecture of claim 1, comprising a mobility management layer coupled to the services layer, the mobility management layer coupled to the radio resource layer.

4. The multi-mode mobile wireless communications device architecture of claim 1, a timing component coupled to the radio resource layer, the timing component having a real-time task processing element and an interrupt processing element both coupled to the first and second radio access technologies.

5. The multi-mode mobile wireless communications device architecture of claim 1, a data router coupled to the services layer, the data router coupled to the first and second radio access technologies.

6. The multi-mode mobile wireless communications device architecture of claim 5, comprising a mobility management layer coupled to the services layer, the mobility management layer coupled to the radio resource layer, the mobility management layer coupled to the data router.

7. The multi-mode mobile wireless communications device architecture of claim 6, a timing component coupled to the radio resource layer, the timing component coupled to the first and second radio access technologies and to the hardware layer.

8. A multi-mode mobile wireless communications device architecture, comprising:
    first and second radio access technologies, the first radio access technology different than the second radio access technology;
    a timing layer for performing real-time and interrupt processing on both of the first and second radio access technologies,
    the timing layer for performing real-time processing of cell selection and reselection, signal measurement, and for reporting to a radio resource component.

9. A method in a multi-mode mobile wireless communications device, comprising:
    communicating on a first radio access technology;
    switching from the first radio access technology to a second radio access technology by transitioning from a first state machine of the first radio access technology to a second state machine of the second radio access technology;
    maintaining a current state while transitioning between the first state machine and the second state machine.

10. The method of claim 9, returning to the current state when transitioning between the first and second state machines is unsuccessful.

11. A method in a multi-mode mobile wireless communications device, comprising:
    performing real-time task processing of first and second radio access technologies;
    performing medium access control (MAC) of the first and second radio access technologies by interrupt processing,
    communicating real-time task processing information to a state transition component, transitioning between first and second state machines of the first and second radio access technologies with the state transition component.

12. A method in a multi-mode mobile wireless communications device, comprising:
    performing real-time task processing of first and second radio access technologies;
    communicating real-time task processing information to a state transition component that transitions between first and second state machines of the first and second radio access technologies.

13. The method of claim 12, communicating control information between the state transition component and a mobility management component.

14. The method of claim 13, communicating control information from the mobility management component to a data router, routing data with the data router between one of the first and second radio access technologies and a services layer based on the control information from the mobility management component.

* * * * *